Figure 1:
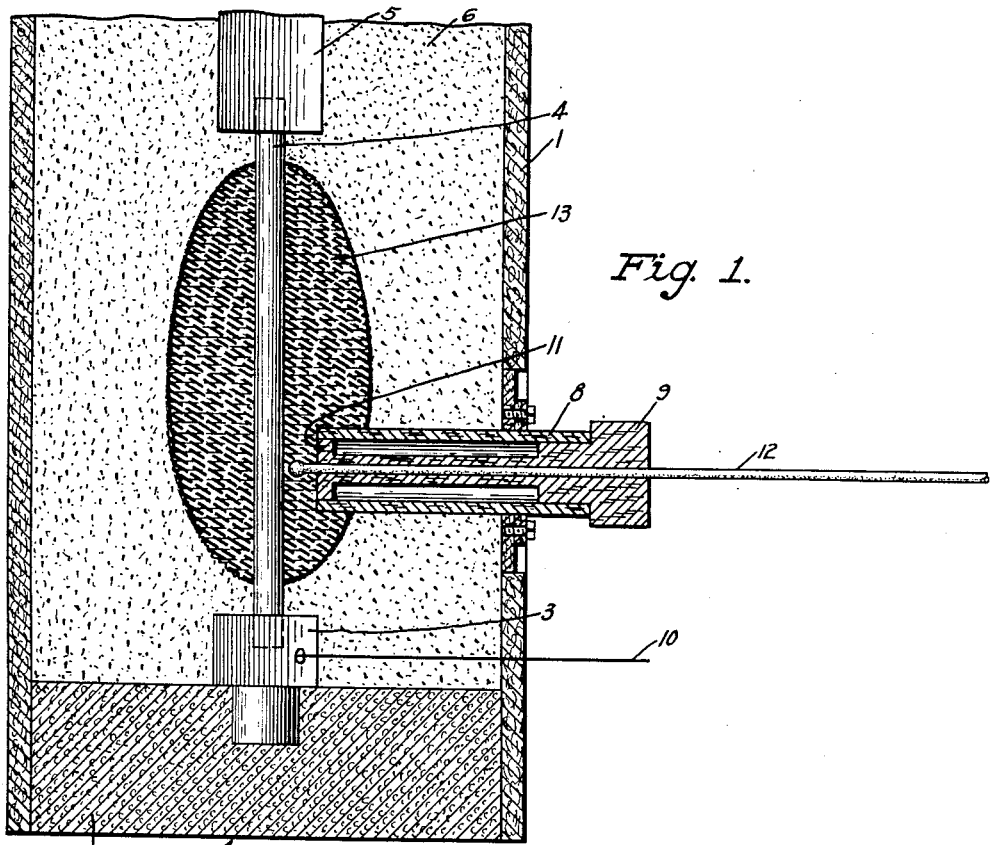

March 15, 1927. 1,621,446
H. L. WATSON
PROCESS AND APPARATUS FOR PRODUCING SILICA ARTICLES
Filed April 1, 1926   3 Sheets-Sheet 1

Inventor,
Harold L. Watson,
by
Attorney.

March 15, 1927. 1,621,446
H. L. WATSON
PROCESS AND APPARATUS FOR PRODUCING SILICA ARTICLES
Filed April 1, 1926   3 Sheets-Sheet 2
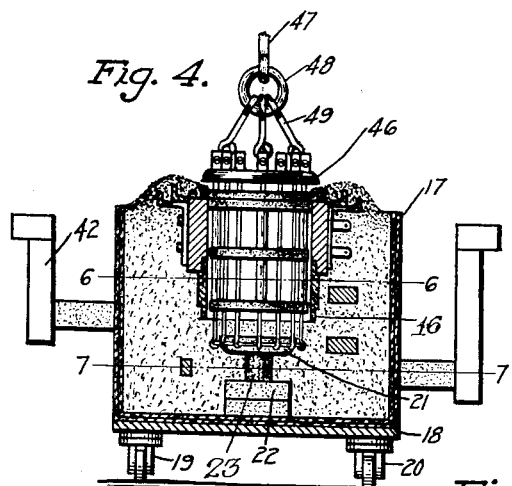
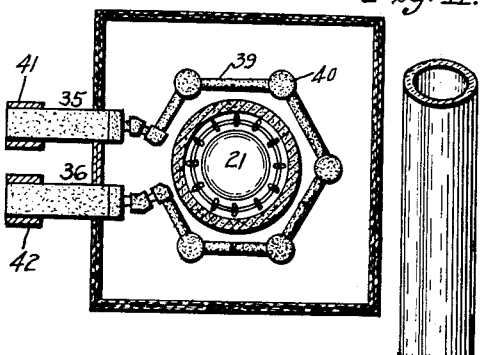
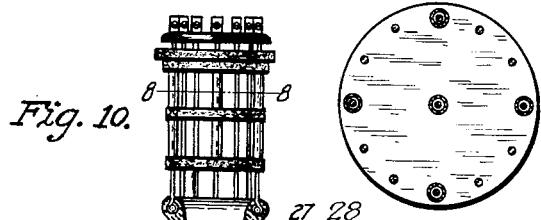
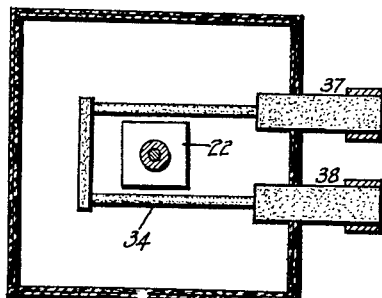
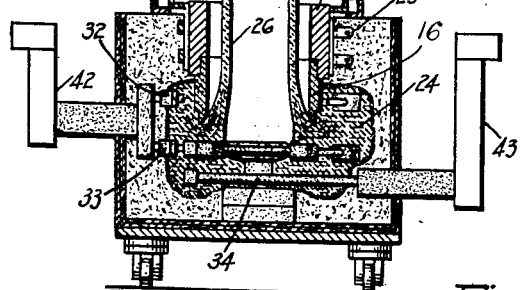
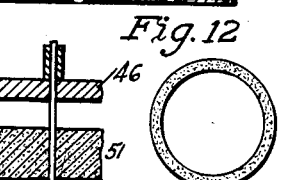
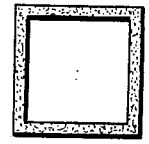
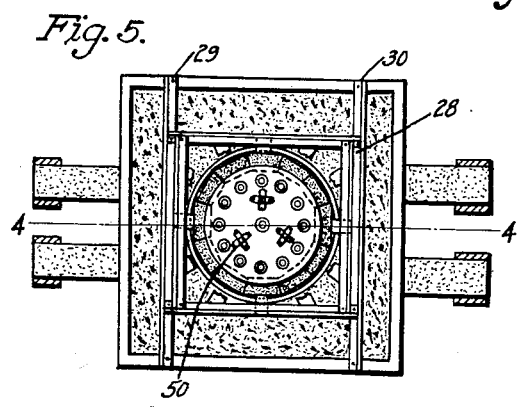
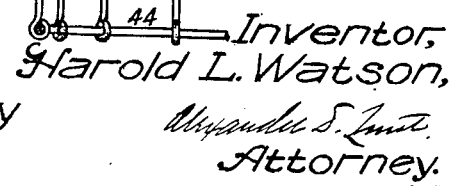
Inventor,
Harold L. Watson,
by
Attorney.

March 15, 1927.

H. L. WATSON 1,621,446

PROCESS AND APPARATUS FOR PRODUCING SILICA ARTICLES

Filed April 1, 1926   3 Sheets-Sheet 3

Inventor,
Harold L. Watson,
by
Attorney.

Patented Mar. 15, 1927.

1,621,446

UNITED STATES PATENT OFFICE.

HAROLD L. WATSON, OF LYNN, MASSACHUSETTS, ASSIGNOR TO GENERAL ELECTRIC COMPANY, A CORPORATION OF NEW YORK.

PROCESS AND APPARATUS FOR PRODUCING SILICA ARTICLES.

Application filed April 1, 1926. Serial No. 99,146.

This application is a continuation in part of Serial No. 697,829, filed March 8, 1924, for processes of shaping quartz.

The present invention relates to the production of shaped articles of vitreous silica, such, for example, as tubes, rods or cylinders.

It is the object of my invention to render more convenient and more rapid the production of silica ware and to provide means whereby such ware may be produced on a larger scale than heretofore.

Silica unlike glass cannot be fused in the sense of being converted to a mobile liquid. When heated to about 1700° C. silica becomes plastic and at this temperature is said to "fuse." At higher temperatures volatilization of silica occurs, the rate of volatilization being greatly accelerated as the temperature is raised. Glasses fuse at temperatures of about 500 to 750° C. The manufacture of containers for the fused glass even at these much lower temperatures requires unusual care. At the high temperature of silica fusion the container problem becomes far more acute. Graphite can be used as a container material under certain conditions, as for example, in a vacuum furnace but it is not readily available for fusing large masses of silica for carrying out fabricating processes such as are used in glass working.

Although the highest grade of transparent, bubble-free silica ware is produced by the fusion of clear quartz crystal in a vacuum there is a demand for cheaper silica ware for purposes not requiring transparency. The vacuum fusion process is intermittent and costly. For some purposes an opaque translucent silica ware, for example, such as produced by the fusion of pure sand, or other inferior grades of silica may be used, cheapness being the main consideration. For example, opaque or translucent silica may be used for purposes in which the transmission of light is not a requirement. In accordance with my invention, I have provided a new method and apparatus whereby silica fusions may be carried out for quantity production, preferably using unfused silica as a support for fused masses of silica, and withdrawing the fused or plastic material by traction in the form of tubes, rods or slabs in such a way that unfused material is not permitted to contaminate the fused material which is withdrawn. In the preferred form of my invention, a portion of a body of silica is rendered plastic by a resistance imbedded therein and the plastic silica is withdrawn through a duct of refractory material leading through the unfused outer portions of the mass. Hollow bodies may be formed in the practice of my invention by drawing silica around a core, which in some cases, may be constituted by the resistance heater itself, the relation of the viscosity of the silica and the rate of withdrawal of the material regulating the size of the bore of the cylinder or tube which thus may be formed.

The above and other features of my invention will be pointed out with greater particularity in the appended claims.

Figure 3:
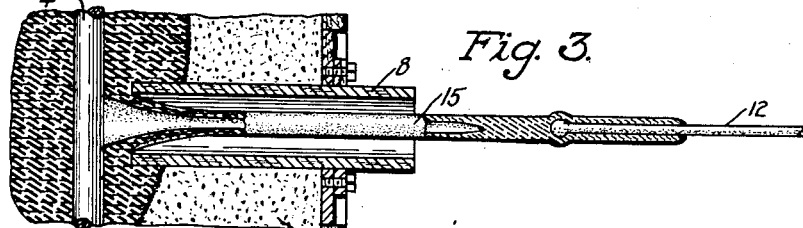
Figure 2:
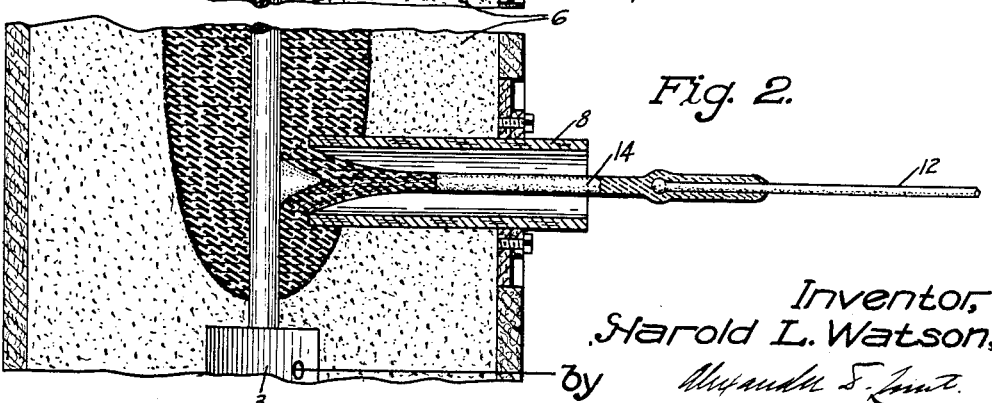
Figure 15:
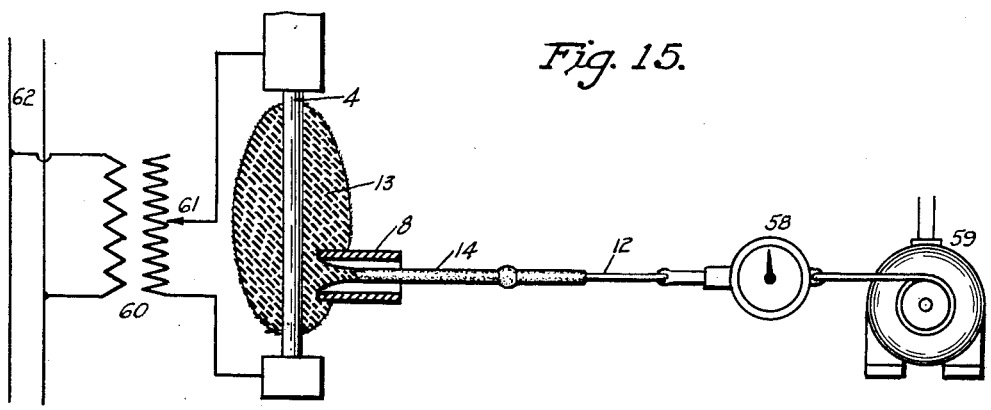
Figure 16:
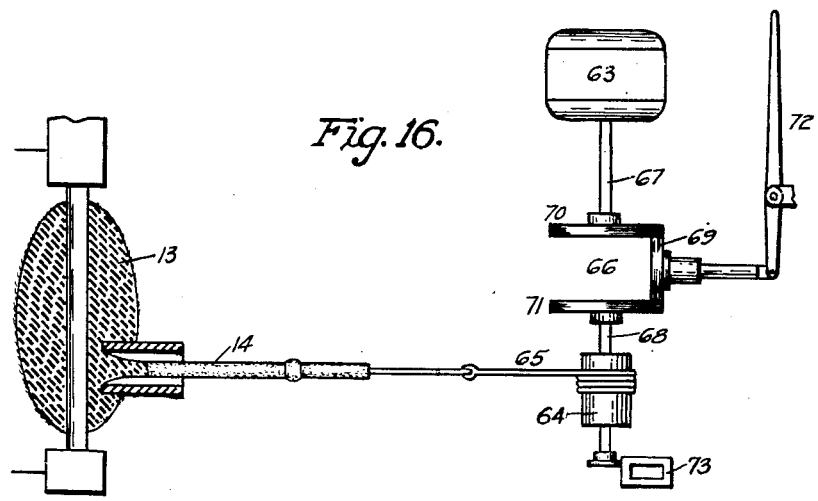

For a complete understanding of my invention reference should be had to the accompanying drawings in which Fig. 1 is a vertical section of a simple apparatus for carrying out my invention; Figs. 2 and 3 are sectional fragmentary views illustrating respectively the formation of a rod and a tube; Fig. 4 is a vertical section of a more highly organized furnace whereby large cylinders may be drawn; Fig. 5 is a top view of the furnace; Figs. 6 and 7 are horizontal sectional views taken on lines 6—6 and 7—7 of Fig. 4; Fig. 10 is a vertical section similar to Fig. 4 but showing the furnace in action, some of the fused material having been withdrawn; Figs. 8 and 9 are detail views of the bait or traction device (Fig. 8 being taken on lines 8—8, Fig. 10); Figs. 11 to 14 inclusive illustrate in perspective and sections of some different forms of quartz articles which may be produced by the practice of my invention, and Figs. 15 and 16 illustrate diagrammatically two forms of apparatus whereby the pulling is carried out and regulated.

The apparatus shown in Fig. 1 comprises an upright elongated receptacle, which in the drawing is shown with the upper end broken away, the construction ordinarily being the same at opposite ends. It comprises an enclosing wall 1 of asbestos board, or other suitable refractory material, the bottom being constituted by a block 2 of refractory substance such as fire brick, soapstone, or the like, into which is seated a terminal 3 for a graphite heater rod 4. This heater rod, which contacts at the opposite end with another terminal 5, preferably also consists of graphite. The heater is surrounded by a mass of comminuted silica 6, which may consist of a good grade of sand or of crushed quartz when a high degree of purity is desired.

A flanged tubular conduit 8 also preferably consisting of graphite or zirconia, projects through the side of the furnace into the mass of silica which becomes heated to plasticity. This conduit is provided with a plug 9 fitting into the open end, and passing through the center of the conduit. It is provided at its end with a graphite flange 11, which closes the opposite or inner end of the conduit. A wire or bait 12 consisting of tungsten, molybdenum, carbon or the like, projects through the plug 9 into contact with the fused silica as indicated. A single electric supply conductor 10 has been indicated, the opposite end of the resistor having a similar conductor (not illustrated). Pressure is exerted between the contacts 3, 5 and the resistor 4 by devices not illustrated.

When silica in the crystalline state is subjected to fusion, it is converted to the vitreous state, the conversion in fact occurring well below the fusion temperature. When a sufficiently high heating current is sent through the resistor rod 4 to bring the silica to a temperature of about 1700 to 1800° C. a portion of the silica is caused to soften and coalesce into the shape of a hollow ovoid slug 13, as indicated in the more heavily stipelled section of the drawing.

The drawing operation is begun by applying traction to the plug 9 causing a portion of the silica glass adjacent the heater 4 to be drawn outwardly substantially at right angles, as indicated in Figs. 2 and 3. The traction upon the silica preferably should be a sustained steady pull. The rate of advance of the material emerging from the conduit 8 determines whether the material coalesces to form a rod 14, as indicated in Fig. 2, or whether the inner walls of the tube 15, which is initially formed, remain separated as indicated in Fig. 3, thereby forming a tube of silica.

The following example will serve to illustrate the operation of the resistance furnace above described both for the production of silica rods and silica tubing. In a furnace provided with a resistor consisting of a graphite rod about 24 inches long and 1 inch diameter and provided with an outlet tube (lettered 8 in the drawing) of about 2½ inches inside diameter, a silica tube may be produced, as shown in Fig. 3, by drawing plastic silica through the outlet tube 8 at the rate of about 2 inches per second, the furnace being supplied with a current of about 930 amperes at a potential of about 9 to 10 volts. The inner surface of the silica plug adjacent the resistor forms the inner surface of the tube. At this rate of emergence the tube will have an outside diameter of about ¾ inch and a wall thickness in the neighborhood of about $\frac{1}{16}$ inch.

When the rate of drawing of the silica is very much decreased, say to about ½ inch per second, and the energy input preferably is increased about ten percent, a solid rod is formed as illustrated in Fig. 2, having a diameter of approximately $\frac{7}{16}$ inch. As the plastic silica from regions remote from the outlet tube tend to flow towards the outlet thus replacing the silica as fast as it is drawn, long lengths of tubing or rod (say 100 feet or longer) may be produced in a single operation.

The surface of the silica rod of tubing made in this way has an opalescent, satin-like appearance, which is produced by very fine longitudinal lines upon the surface of the articles, showing the direction in which the material was drawn out of the furnace.

The apparatus illustrated by Figs. 4 to 10 inclusive is adapted particularly for producing larger silica bodies, as for example, large cylinders (Fig. 11) having a diameter of 16 inches or more.

Referring to Figs. 4 and 5 in particular, the furnace comprises a receptacle 17 which may be made of refractory material such as asbestos, reenforced at the corners with angle irons and open at the top. It may be supported on a metal plate 18 which in turn rests on the rollers 19, 20. The core over which the silica is drawn in the embodiment of my invention shown in Figs. 4 to 10 is not constituted by the heater. A separate core 21 is provided supported upon a fire brick or the refractory support 22 by a graphite pedestal 23, which preferably is hollow to reduce heat losses to a minimum. As shown in Fig. 10 the fused silica when traction is applied flows laterally from the fusion zone 24 toward the outlet chute formed by the shaping die 16 over the core 21 thereby producing a hollow body, such as the cylinder 26. The shaping die 16 which corresponds to the inner end of the conduit 8 (Fig. 1) is surmounted by a cylindrical cover 27, consisting of zirconium silicate, or other suitable refractory insulating material. The die 16 and the cover 27 are attached by clamping rings 25 to a frame 28 resting on the iron bars 29, 30 which in turn are supported on the sides of the furnace container as shown best in Fig. 5.

The charge of sand, or other form of silica, is fused (or heated to plasticity) by three sets of resistors 32, 33 and 34 (see Fig. 10), the resistors 32, 33 being connected in parallel to the terminals 35, 36 (Fig. 6) and the lowermost resistor 34 being connected to the terminals 37, 38 entering the opposite wall of the furnace (Fig. 7). As best shown in Fig. 6 the resistors 32, 33 consist of a plurality of sections 39 connected by the blocks 40 and arranged in a hexagonal form about the core 21 and the shaping die 16. The two sets 32, 33 are connected electrically in parallel both receiving current through the bus bars 41, 42. The lowermost set of resistors 34 are arranged in the form of a rectangle and are supplied with current by a bus bar 43. The main function of the resistor 34 is to maintain the silica around the core 21 thoroughly fused. It supplies heat losses by conduction through the pedestal 23.

The pulling apparatus, or bait, comprises a wire 44, approximately circularly arranged and supported from the vertical wires 45 which in turn are supported from a metal plate 46 (Fig. 9). These wires may consist of a suitable refractory metal, such as tungsten or molybdenum. Traction is exerted upon the plate 46 by a cable 47 through the intermediary of a ring 48 and a number of short cables 49 which are affixed to the plate 46 by eyebolts 50 (see Fig. 5). Below the metal plate 46 are a graphite cover 51 and two heat insulating plates or disks 52, 53. The vertical wires 45 are surrounded by quartz tubes or other suitable refractory material 54 which maintain the plates in spaced relation. Passing through the center of the plates 46, 51, 52 and 53 is a rod 55 upon which is formed a stop 56 limiting the downward movement of the disks. When the pulling apparatus is in the position shown in Fig. 4, the heat generated electrically in the resistors is insulated by the disks 51, 52, 53.

When the furnace is put into operation the comminuted silica is poured around the resistors and heaped upon the top of the receptacle as shown in Figs. 4 and 10. The heating current then is turned on and maintained until a temperature of about 1800° C. is reached thereby causing fusion of the charge as shown in Fig. 10. Traction then is applied to the pulling device. As the plastic silica adheres to the wire 44, it pulls out of the furnace in a form determined by the shape of the die 16 and the core 21. The chute formed by the die 16 and the cover 27 excludes unfused silica and shields the emerging object from heat radiated from the fusion zone. Articles of various shapes may be produced as shown in the sectional views Figs. 12 to 14.

The bore or diameter of the hollow body is determined by the relation of the rate of pulling to the viscosity of the fused silica. As shown in Fig. 15 the regulation of the traction with respect to the viscosity of the fused silica may be carried out by interposing a device for indicating traction between the motor 59 and the bait 12 whereby the silica cane 14 is drawn from the silica fusion 13. Electric energy is supplied to the resistor 4 by the secondary of a transformer 60, one terminal 61 of which is adjustable so as to vary the secondary voltage. The primary of the transformer receives alternating current from the main 62. If the indicating device 58 shows that the pull exerted by the electric motor 59 departs from a predetermined value, then the viscosity of the fused silica 13 may be varied accordingly by regulating the voltage so as to vary the heating current in the resistor 4. For example, if the pull required is shown to be too great, the temperature is raised, decreasing the viscosity of the fusion. By maintaining the pull constant the diameter of the cane (or other object) may be varied by varying the viscosity, a higher temperature and hence lower viscosity resulting in a lesser diameter.

On the other hand, the viscosity of the fusion 13 may be maintained substantially constant and the amount of traction varied by any suitable apparatus, as diagrammatically indicated in Fig. 16. An electric motor 63 in this figure rotates the drum 64 upon which the traction cable 65 is wound, a speed varying device 66 being interposed between the motor shaft 67 and the shaft 68 of the winding drum, suitable speed reduction gearing (not shown) also being provided. With such an arrangement the diameter of a rod 14 or silica article of other form which is drawn from the fusion is determined by moving the frictional power transmission disk 69 toward or away from the center of the disk 71 by means of the lever 72 in order to either slow down or speed up the rate of withdrawal of the silica from the fused mass. An increased rate of withdrawal decreases the diameter of the object being drawn.

The speedometer 73 which is geared to the traction device may be calibrated in any desired way to permit of a choice of speed suited for the production of different sizes of material which are to be produced with a given die opening. A constant electric energy input is fed into the furnace, giving a silica fusion of corresponding constant viscosity. By setting the speed of drawing at a value predetermined by experiment different sized stock may be produced. In the case of the core heater illustrated in Figs. 15 and 16 a sufficiently high rate of drawing will result in a tubular article as above indicated.

What I claim as new and desire to secure by Letters Patent of the United States is:

1. The process of shaping silica which consists in heating a part only of a mass of silica to fusion in such a manner that the unfused silica serves as a support for the fused silica, exerting sufficient traction upon the fused silica in the heating zone to withdraw the same and excluding unfused silica from withdrawal.

2. The process of forming articles of vitreous silica which consists in heating a mass of silica to a fusion temperature, withdrawing the fused silica by the application of traction, excluding unfused silica from being removed together with fused silica and feeding unfused material into the fusion zone to replace silica withdrawn from the fused mass.

3. The process of manufacturing elongated articles of silica which consists in heating a mass of silica to plasticity by a resistor embedded therein and withdrawing material from a region adjacent said resistor while excluding more remote material which has been incompletely fused.

4. The process of manufacturing elongated articles of silica which consists in heating to plasticity a mass of silica, drawing said material while plastic from a region adjacent the application of heat to form the desired article, and feeding less plastic material in place of material thus removed.

5. The process of manufacturing silica tubing which consists in heating to plasticity a mass of silica about a core of refractory material which is substantially inert with respect to silica and withdrawing said material when plastic by traction from a region adjacent said core at such speed that a tube is formed, the interior wall of which is constituted by silica adjacent said core.

6. The process of making articles of silica glass which consists in heating to plasticity a mass of silica about an electrical resistance core, withdrawing a portion of the silica while plastic from a region adjacent said core and regulating the rate of withdrawal of said silica to produce either a hollow or a solid article.

7. The process of producing articles of elongated shape from silica which consists in charging silica about a carbonaceous core, conducting a heating current through said core to render the silica charge plastic, inserting into said charge a tube of refractory material and withdrawing plastic silica through said tube.

8. The process of manufacturing articles of vitreous silica which consists in heating to a plastic state a hollow mass of silica and withdrawing by traction a portion of said plastic silica from a region adjacent the interior surface of said mass, the withdrawing occurring in a direction substantially normal to an interior surface of said mass.

9. The process of producing silica articles of elongated shape which consists in charging comminuted silica about a resistor of refractory, conducting material which is substantially inert chemically with respect to silica at a temperature sufficiently high to render the silica plastic, conducting heating current through said resistor to heat said silica to plasticity, withdrawing plastic silica by traction and regulating the rate of withdrawal to produce a desired form in the silica withdrawn.

10. The process of shaping silica which consists in fusing a mass of silica, withdrawing material from said mass by traction, feeding unfused silica into the fusion zone and excluding unfused silica from being removed from the fusion zone together with the fused material.

11. The process of shaping silica which consists in fusing a mass of silica, withdrawing silica as a shaped article by traction from the silica fusion and maintaining the desired form of the article by regulating the relation of the rate of viscosity of the silica and the rate of withdrawal.

12. An apparatus for fabricating articles of vitreous silica which consists in the combination of a receptacle adapted to hold a mass of fused silica, a resistance heater located in said receptacle, means for exerting traction to withdraw fused silica, and means for excluding imperfectly fused and unfused silica from removal together with the fused silica.

13. An apparatus for fabricating articles of vitreous silica which consists in the combination of a receptacle adapted to contain a silica fusion, a heater located in said receptacle whereby silica may be fused, means for applying traction to the fused silica to withdraw the same from the mass, and means for excluding unfused material from adhering to the fused material which is withdrawn.

14. An apparatus for fabricating articles of vitreous silica having a predetermined form which consists in the combination of a receptacle adapted to contain a silica fusion, heating means whereby silica may be heated to fusion, means for shaping the fused silica by the application of traction, means for feeding unfused material into said receptacle and a barrier whereby unfused material will be excluded from contact with the shaped material and whereby the shaped material will be shielded from the heating means.

15. An apparatus for producing elongated articles of silica which consists in the combination of a container, a resistance heater therein, and means for withdrawing a portion of a silica charge while heated to a plastic state from a region adjacent said heater, and means for excluding during said drawing imperfectly fused silica, which is located more remote from said heater than the silica which is being drawn.

16. An apparatus for producing elongated articles of silica which consists in the combination of a container adapted to contain silica heated to plasticity, means whereby a silica charge therein may be heated in part to plasticity, a core of refractory material in the silica charge, a refractory tube extending from the exterior to a region adjacent said core, and means for drawing silica from a region adacent said core through said tube.

17. An apparatus for producing shaped articles of vitreous silica which consists in the combination of a container, an elongated resistance heater therein, around which a charge of silica may be placed, a refractory tube extending substantially at right angles from said heater from a region adjacent said heater through the wall of said container and means for withdrawing plastic silica by traction through said tube.

In witness whereof, I have hereunto set my hand this 29th day of March, 1926.

HAROLD L. WATSON.